(12) United States Patent
Kienzle et al.

(10) Patent No.: US 11,060,900 B2
(45) Date of Patent: Jul. 13, 2021

(54) FASTENING ASSEMBLY FOR A RADAR LEVEL-MEASURING DEVICE

(71) Applicant: VEGA GRIESHABER KG, Wolfach (DE)

(72) Inventors: Klaus Kienzle, Zell am Harmersbach (DE); Fritz Lenk, Schiltach (DE)

(73) Assignee: VEGA GRIESHABER KG, Wolfach (DE)

( * ) Notice: Subject to any disclaimer, the term of this patent is extended or adjusted under 35 U.S.C. 154(b) by 275 days.

(21) Appl. No.: 16/385,156

(22) Filed: Apr. 16, 2019

(65) Prior Publication Data

US 2019/0353514 A1     Nov. 21, 2019

(30) Foreign Application Priority Data

May 17, 2018 (EP) .................................. 18173031

(51) Int. Cl.

| | | |
|---|---|---|
| *G01F 23/284* | (2006.01) | |
| *G01S 7/40* | (2006.01) | |
| *G01S 13/60* | (2006.01) | |
| *G01F 25/00* | (2006.01) | |
| *H01Q 1/22* | (2006.01) | |
| *G01S 7/02* | (2006.01) | |
| *G01S 13/10* | (2006.01) | |

(52) U.S. Cl.
CPC ........ *G01F 23/284* (2013.01); *G01F 25/0061* (2013.01); *G01S 7/40* (2013.01); *G01S 13/60* (2013.01); *H01Q 1/225* (2013.01); *G01S 13/103* (2013.01); *G01S 2007/027* (2013.01)

(58) Field of Classification Search
CPC ...... G01F 23/284; G01F 25/006; G01S 13/88; G01S 13/103; G01S 2007/027; G01S 2007/4091; G01S 7/03; G01S 13/60; G01S 7/40; G01D 11/24; H01Q 1/225; H01Q 13/02; H01Q 1/42; G01N 21/15
USPC ......................................... 342/124; 73/290 V
See application file for complete search history.

(56) References Cited

U.S. PATENT DOCUMENTS

| | | | | |
|---|---|---|---|---|
| 4,566,321 A | * | 1/1986 | Zacchio | ................ G01F 23/284 |
| | | | | 73/290 R |
| 9,404,787 B2 | * | 8/2016 | Cheng | .................... H01Q 13/02 |
| 2006/0201245 A1 | * | 9/2006 | Huber | ................ G01F 23/2962 |
| | | | | 73/290 R |

(Continued)

FOREIGN PATENT DOCUMENTS

| | | |
|---|---|---|
| DE | 4336494 A1 | 10/1993 |
| DE | 10060069 C1 | 4/2002 |

(Continued)

OTHER PUBLICATIONS

Search Report for related European application 18173031.8, issued by European Patent Office dated Nov. 11, 2018.

*Primary Examiner* — Olumide Ajibade Akonai
(74) *Attorney, Agent, or Firm* — William Gray Mitchell

(57) ABSTRACT

A fastening assembly for a radar level-measuring device with an antenna with a main emission direction, comprising a microwave window for the spatial and thermal separation and microwave connection of a first space and a second space with a plate-shaped, disk-shaped barrier at least partially permeable to microwaves, wherein a surface of the barrier oriented towards the antenna includes an angle unequal to 90° with the main emission direction.

12 Claims, 2 Drawing Sheets

(56) References Cited

U.S. PATENT DOCUMENTS

2014/0047917 A1\* 2/2014 Vogt ................. H01Q 19/062
                                                                         73/290 V
2017/0227392 A1\* 8/2017 Rivera ................. G01F 23/22

FOREIGN PATENT DOCUMENTS

| DE | 602005003297 T2 | 3/2008 |
| DE | 19982569 T1 | 9/2011 |
| EP | 2698869 A1 | 2/2014 |

\* cited by examiner

FASTENING ASSEMBLY FOR A RADAR LEVEL-MEASURING DEVICE

CROSS REFERENCE TO RELATED APPLICATIONS

This patent application claims priority to European Patent Application 18 173 031.8, filed on May 17, 2018.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a fastening assembly for a radar level-measuring device.

Background of the Invention

The present invention relates to a fastening assembly for a radar level-measuring device with the features of the preamble of patent claim 1 and to a radar level-measuring device with such a fastening assembly according to the preamble of patent claim 15.

Field devices, particularly field devices employed for measuring filling levels or limit levels, are often based on the principle of time-of-flight measurements. In time-of-flight measurements, the signal travel times of emitted measurement signals, particularly of radar signals or guided microwave pulses, is determined. The desired measuring quantity, e.g. a filling level or limit level, is then determined from these signal travel times. The signals have a certain frequency. Radar signals and microwave signals can be attributed to the high-frequency technology range (HF technology). As signals situated in the high-frequency technology range, signals in the frequency range of up to 2 GHz are typically used as guided microwave signals, and signals in the range from 5 GHz to 85 GHz and beyond are used as radar signals.

Radar measuring devices, e.g. radar level-measuring devices which, in accordance with the time-of-flight principle, detect a filling level of a filling material located in a container, particularly of liquids and bulk material, are known from the prior art. Radar level-measuring devices of this type are equipped with horn antennas, for example, via which an HF signal that has been coupled in is emitted in the direction of the filling material and reflected by the latter. The microwave signals reflected by the filling material are captured and evaluated in a combined transmitter/receiver system of the radar level-measuring device.

Frequently, the radar level-measuring devices are arranged on the measuring container or, more generally, the measuring point via a fastening assembly with a microwave window for the spatial and thermal separation and microwave connection of a first space and a second space with a plate-shaped, disk-shaped barrier that is at least partially permeable to microwaves. The fastening assembly serves for decoupling the radar level-measuring device from the measuring container, in particular thermally, in order thus to keep negative thermal influences away from the radar level-measuring device. In the known fastening assemblies, the barrier is configured as a plate or lens oriented perpendicularly to the main emission direction. These assemblies are perceived as being disadvantageous because major interfering reflections, which affect a filling level measurement, emanate from the barrier.

It is the object of the invention to develop a known fastening assembly in such a way that it overcomes the issues known from the prior art, in particular, that it reduces the interfering reflections.

This object is achieved with a fastening assembly as fully disclosed herein.

BRIEF SUMMARY OF THE INVENTION

In a preferred embodiment, a fastening assembly (1) for a radar level-measuring device (3) with an antenna (5) with a main emission direction (H), comprising a microwave window (7) for the spatial and thermal separation and microwave connection of a first space (I) and a second space (II) with a plate-shaped, disk-shaped barrier (9) at least partially permeable to microwaves, characterized in that a surface of the barrier (9) oriented towards the antenna (5) includes an angle unequal to 90° with the main emission direction (H).

In another preferred embodiment, the fastening assembly (1) as described herein, characterized in that the angle ($\alpha$) is greater than 60°, preferably greater than 75°, in particular 80°.

In another preferred embodiment, the fastening assembly (1) as described herein, characterized in that the barrier (9) is disposed in a retaining ring (13) located in a flange (15).

In another preferred embodiment, the fastening assembly (1) as described herein, characterized in that the retaining ring (13) has at least one flushing air duct (14).

In another preferred embodiment, the fastening assembly (1) as described herein, characterized in that the retaining ring (13) is configured to be tiltable relative to the flange (15).

In another preferred embodiment, the fastening assembly (1) as described herein, characterized in that the retaining ring (13) has the outer contour (131) of a spherical segment, and the flange (15) an inner contour (151) corresponding thereto.

In another preferred embodiment, the fastening assembly (1) as described herein, characterized in that the antenna (5) and the barrier (9) are disposed in a housing (17) that secures the antenna (5) and the barrier so that they are spaced apart.

In another preferred embodiment, the fastening assembly (1) as described herein, characterized in that a position of the retaining ring (13) can be changed and fixed by means of at least one, preferably two adjusting devices (19) accessible from outside the housing (17).

In another preferred embodiment, the fastening assembly (1) as described herein, characterized in that the adjusting devices (19) are configured as two knurled screws disposed in the housing (17).

In another preferred embodiment, the fastening assembly (1) as described herein, characterized in that the adjusting device (19) is configured as at least one pivot lever.

In another preferred embodiment, the fastening assembly (1) as described herein, characterized in that, the housing (17), on its inner face, is lined with or made from a microwave-absorbing material (21) at least in some portions, preferably completely.

In another preferred embodiment, the fastening assembly (1) as described herein, characterized in that the housing (17) is suitably configured for accommodating a plurality of differently configured radar level-measuring devices (3).

In another preferred embodiment, the fastening assembly (1) as described herein, characterized in that the retaining ring (13) has a two-part configuration as two wedge rings that can be rotated relative to one another in the circumferential direction, of which the one is fixed at least in the axial direction and the other secures the barrier (9).

In another preferred embodiment, the fastening assembly (1) as described herein, characterized in that the barrier (9) has a coating (91), preferably an anti-adherent coating, at least on a surface facing away from the antenna (5).

DETAILED DESCRIPTION OF THE INVENTION

Figure 1:
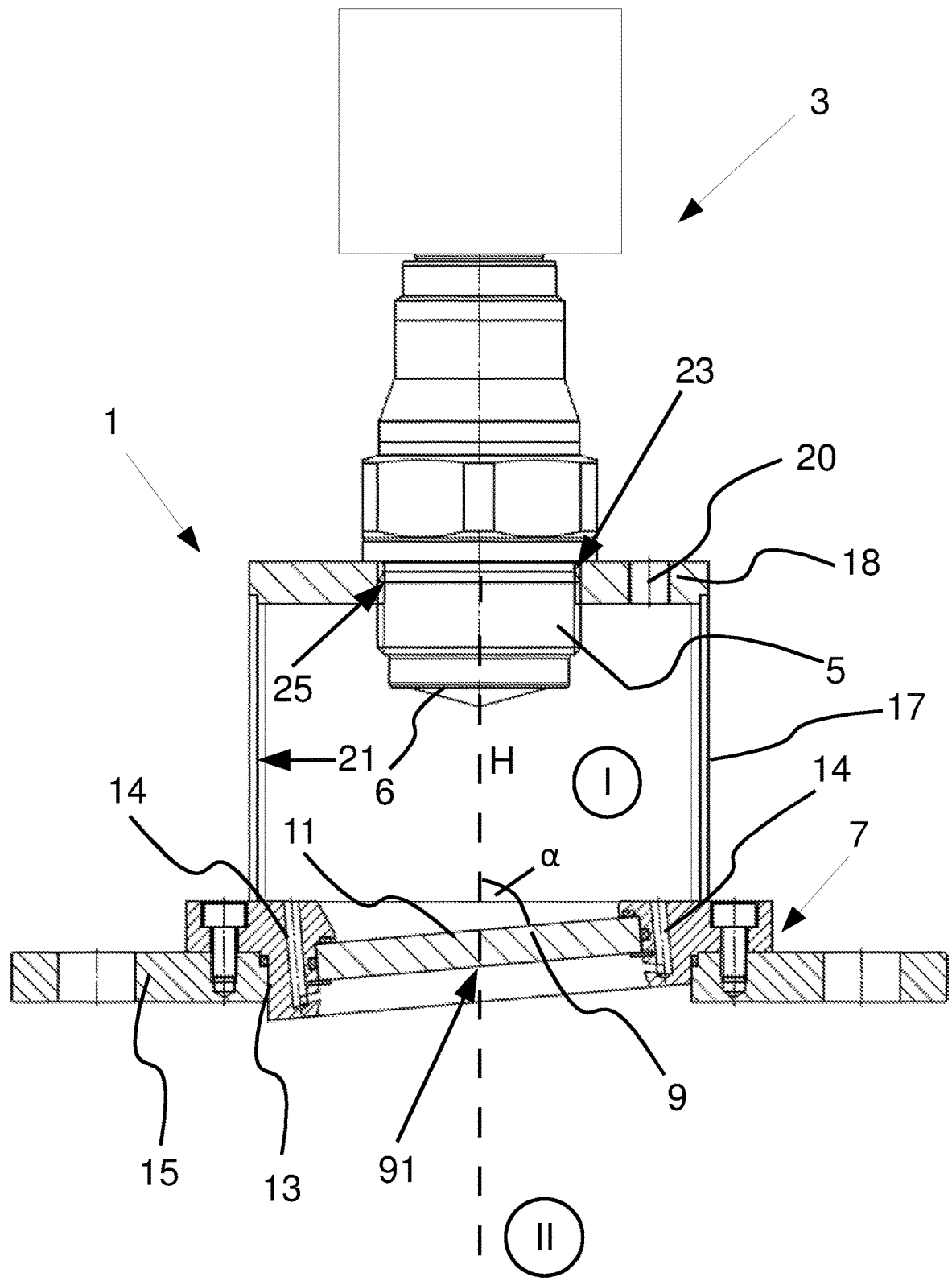
FIG. 1 is a line drawing evidencing a first exemplary embodiment of a fastening assembly according to the present application.

The invention is a fastening assembly according to the invention for a radar level-measuring device with an antenna with a main emission direction, comprising a microwave window for the spatial and thermal separation and microwave connection of a first space and a second space with a plate-shaped, disk-shaped barrier at least partially permeable to microwaves is characterized in that a surface of the barrier oriented towards the antenna includes an angle unequal to 90° with the main emission direction.

In the present application, the main emission direction of an antenna is supposed to be understood to be, in particular, a main propagation direction of emitted electromagnetic waves. Generally, this main emission direction is a direction of an extension of the axis of symmetry of the antenna and is oriented in a perpendicular direction onto a filling material surface.

Due to the fact that the surface of the barrier oriented towards the antenna includes an angle unequal to 90° with the main emission direction of the antenna, it is accomplished that reflections occurring on the surface of the barrier are not directly reflected towards the antenna, but are deflected laterally. In this manner, interfering signals due to reflections on the barrier are reduced, and a measuring accuracy of the assembly is improved.

The barrier may consist e.g. of a ceramic material, particularly aluminum oxide ceramic material, glass or plastics. Particularly high-performance plastics, e.g. polyether ether ketone (PEEK) or aromatic polyimides, such as they are sold by the company DuPont under the trademark VESPEL, may be used as plastics.

Depending on the wavelength of the employed electromagnetic radiation in the material of the barrier and the mechanical stresses occurring, a thickness of the barrier may ideally be $\lambda/2$ or an integer multiple thereof.

By using the present invention, various (existing) antenna systems or radar level-measuring devices with limited temperature characteristics may be used in applications with hot process conditions.

The angle between the main emission direction and the surface of the barrier is preferably greater than 60°, more preferably greater than 75°. A positive effect can be registered already from an angle of a few degrees, wherein a particularly good effect can be achieved starting at a deviation of 10°. Therefore, angles between 60° and 85°, in particular between 70° and 80°, are particularly preferred. Every angle differing from 90° provides for an improvement of the direct reflection.

A particularly simple fastening of the barrier can be achieved if the latter is disposed in a retaining ring, which in turn is fastened in or to a flange. Using a flange, the fastening assembly may simply be fastened to the usually employed fastening sockets of filling material tanks, for example, but also to other measurement points. All commonly used flange connections, such as screw flanges, clamping flanges or welding flanges, may be employed. A simple fastening of the retaining ring to the flange may be attained by a screw connection. However, other fastening methods, e.g. a clamping connection, may also be employed.

In particular, an inner contour of the flange may be configured in a conical or spherical segment-shaped manner. In this way, the retaining ring can be prevented from ending up in the interior of the tank via the opening.

The retaining ring may include at least one flushing air duct, via which flushing air can be applied to a surface of the barrier facing towards the process. In this way, a surface of the barrier can be kept free from particles in order to prevent buildup and a reduced permeability of the barrier caused thereby. At the same time, the barrier can be cooled by the flushing air.

In order to enable an adaptation of the angle between the main emission direction of the antenna and the barrier surface facing towards the antenna, it may be useful if the retaining ring is configured to be tiltable relative to the flange.

In the sense of the present application, "tiltable" means that an angle between the retaining ring and the flange is variable, so that the barrier disposed in the retaining ring is also variable, with respect to its angle, relative to the flange, and thus relative to the main emission direction of the antenna.

This can be achieved, for example, by the retaining ring having the outer contour of a spherical segment, and the flange an inner contour corresponding thereto.

A spherical segment in the sense of the present application is a section of a sphere delimited by two plane-parallel surfaces, wherein the two surfaces, which hereinafter are also referred to as the cover surface and the bottom surface, intersect the sphere.

If the flange and the retaining ring have inner and outer contours that are configured in this way and correspond to each other, the retaining ring can be tilted in the flange in order thus to adapt the angle between the surface of the barrier and the main emission direction. Such an option for adaptation is advantageous because the optimum angle, at which as few interfering reflections as possible occur, may be dependent on the antenna used and on the signal frequency or wavelength used.

A simple mechanical assembly is obtained if the antenna and the barrier are disposed in a housing that secures the antenna and the barrier so that they are spaced apart. In a simple configuration, such a housing may have the form of a circular cylinder, wherein the barrier or the retaining ring with the barrier is disposed in a bottom surface of the circular cylinder, and a cover surface is configured as a lid in which the antenna of the filling level measuring device is secured.

The lid may be configured with a plurality of different adapters for accommodating different antennas, in particular antennas with different sizes. Alternatively, however, the lid may also be replaceable, with different lids being configured for accommodating different antennas.

A position of the retaining ring may be capable of being changed or fixed by means of at least one, preferably two adjusting devices accessible from outside the housing. In this way, an adjustment of the retaining ring, and thus a setting of the angle between the barrier and the main emission direction, is realized in a simple manner. Presuming a rotationally symmetric emission pattern of the antenna, a single adjusting device with which the retaining ring can be pivoted about an axis, for example, is sufficient. If a polarization of the emitted signal is taken into account, it may also be necessary for the angle to be adjusted to a certain rotatory orientation. In these cases, a configuration with two adjusting devices, which act on the retaining ring with an offset of, preferably, 90°, is to be preferred.

For example, the adjusting devices may be configured as two knurled screws disposed in the housing. By means of such knurled screws, a setting of the angle can be fine-tuned and at the same time secured against inadvertent maladjustment. For example, the knurled screws may act on the spherical segment in the axial direction, for example, so that it is adjusted relative to the main emission direction depending on the setting. For this purpose, the spherical segment may be configured to be spring-biased in the direction of the knurled screws, or to be connected to the latter in an articulated manner.

Alternatively, the adjusting device may be configured as at least one pivot lever. Depending on the configuration of the lever, a tilting of the retaining ring about one axis or about two axes can be achieved by means of such a pivot lever. If two pivot levers are disposed offset in the circumferential direction, pivoting can take place, in any case, about two different axes. For this purpose, the pivot levers are preferably offset by 90°.

In order to further reduce interfering reflections, the housing, on its inner face, may be lined with or made from a microwave-absorbing material at least in some portions, but preferably completely.

Suitable microwave-absorbing materials may include, for example, carbon fiber reinforced plastics, foam absorbers, magnetic absorbers or a porous, e.g. foamed, ceramic material made of aluminum oxide or silicon carbide.

As was already indicated, the housing may be suitably configured for accommodating a plurality of differently configured antennas, either by means of different adapters or replaceable lids.

The retaining ring may also have a two-part configuration as two wedge rings that can be rotated relative to one another in the circumferential direction, of which the one is fixed at least in the axial direction in the housing and the other secures the barrier.

Rotating the wedge rings relative to one another changes an angle between them, so that a simple adjustment option for the angle between the main emission direction and the barrier can also be obtained in this way.

The barrier may have a coating at least on a surface facing away from the antenna. Preferably, the coating may be configured as an anti-adherent coating, but may also include a protective layer against abrasive media or the like.

According to the invention, a radar level-measuring device with an antenna with a main emission direction has a fastening assembly comprising a microwave window for the spatial and thermal separation and microwave connection of a first space and a second space with a plate-shaped, disk-shaped barrier at least partially permeable to microwaves, wherein a surface of the barrier oriented towards the antenna includes an angle unequal to 90° with the main emission direction.

Preferably, the fastening assembly is configured in accordance with the above description.

DETAILED DESCRIPTION OF THE FIGURES

FIG. 1 shows a first exemplary embodiment of a fastening assembly 1 according to the present application. The fastening assembly 1 is substantially comprised of a cylindrical housing 17 sealed at the top with a cover 18 and at the bottom with a microwave window 7. In the present exemplary embodiment, the microwave window 7 is formed by a retaining ring 13 into which a barrier 9 is inserted. The barrier 9 is permeable to electromagnetic radiation of the wavelength used in the present case, and thus separates an inner space of the housing 17, which is also referred to as the first space I in the present case, from a second space II, which is the inner space of a measuring container in the present exemplary embodiment.

In the present exemplary embodiment, the microwave window 7 is inserted into a flange 15 and connected thereto via a plurality of peripherally disposed screws. For its part, the flange 15 is configured as a so-called screw flange, which can be connected to a corresponding fastening assembly of a measuring container, e.g. a tank.

A radar level-measuring device 3, which in the present exemplary embodiment is screwed via a male thread 23 located on the radar level-measuring device 3 into a corresponding female thread 25 of the lid 18, is mounted in the lid 18 of the housing 17. In the present exemplary embodiment, an antenna 5 of the radar level-measuring device 3 is configured as a horn antenna, which on the front thereof is sealed from the first space I by means of a cover 6 for beam shaping. The antenna 5 has a main emission direction H extending in the extension of a longitudinal axis of the radar level-measuring device 3.

As is apparent from FIG. 1, a surface 11 of the barrier 9 oriented towards the antenna 5 includes an angle $\alpha$ with the main emission direction H that is smaller than 90° and in the present case about 85°. Due to the fact that the surface 11 is inclined by 85° relative to the main emission direction H, it is accomplished that electromagnetic waves emitted by the radar level-measuring device 3 are reflected at the surface 11 towards the radar level-measuring device 3 not in a perpendicular and direct manner, but that they are laterally deflected by a total of 10°, in accordance with the laws of reflection, i.e. angle of incidence=angle of reflection. The interfering reflection caused by the barrier 9 thus does not directly hit the antenna 5 of the radar level-measuring device 3, but is laterally deflected by the latter into the housing 17. In order to avoid further unchecked reflections and/or resonances, an inner face of the housing 17 is lined with a microwave-absorbing material 21.

In the present exemplary embodiment, the retaining ring 13 is provided with six flushing air ducts 14, two of which are visible in the present sectional view, and which direct flushing air supplied via a flushing air connection 20 provided at the rear of the lid 18 onto a side of the barrier 9 facing away from the antenna 5. On the one hand, the barrier 9 can thus be kept free from particles and, on the other hand, cooled by means of the flushing air. In addition to the flushing air ducts 14, the barrier 9 is provided, on the side facing away from the antenna 5, with a coating 91 configured as an anti-adherent coating. In this way, a buildup of particles and the like can be reduced.

Figure 2:
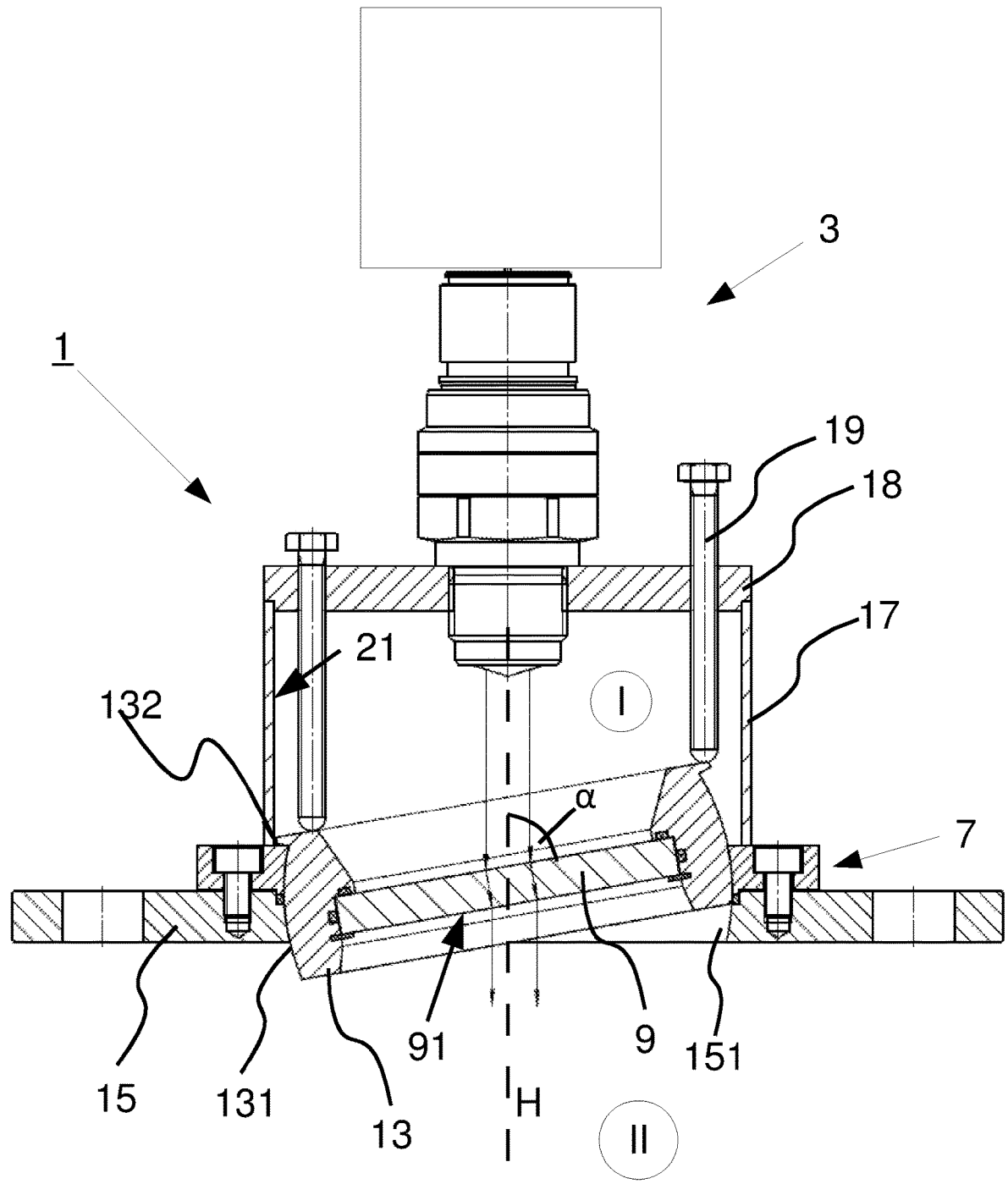
FIG. 2 is a line drawing evidencing a second exemplary embodiment of a fastening assembly according to the present application.

FIG. 2 shows a second exemplary embodiment of a fastening assembly 1 according to the present application.

In the exemplary embodiment shown in FIG. 2, the microwave window 7 has a retaining ring 13 that has the outer contour 131 of a spherical segment and is disposed in a flange 15 with an inner contour 151 corresponding thereto. At an end facing towards the antenna 5, the outer contour 131 of the retaining ring 13 has a molded-on portion 132, which in the present exemplary embodiment is configured as a peripheral web. This molded-on portion 132 prevents the retaining ring 13 from slipping out of the fastening assembly 1 in the direction of the second space II and falling into the measuring vessel located there, for example.

In the present exemplary embodiment, a position of the retaining ring 13 relative to the flange 15 is adjustable by means of two knurled screws 19 disposed in the lid 18 of the housing 17. In this way, the angle α between the main emission direction H and the surface 11 of the barrier 9 facing towards the antenna 5 is adjustable, so that a particularly well-suited angle α can be chosen, depending on the polarization and wavelength of the electromagnetic radiation used by the radar level-measuring device 3.

In an alternative embodiment, the retaining ring 13 may have a two-part configuration, wherein the two parts are configured as two wedge rings that can be rotated relative to one another. One of the wedge rings is secured in a bracket of the microwave window 7, or to the flange 15 in an axially stationary manner, wherein the other one of the wedge rings is configured to be rotatable relative to the latter and secures the barrier 9. Thus, the angle α between the surface 11 facing towards the antenna 5 and the main emission direction H can be adjusted by rotating the wedge rings relative to one another.

Such a configuration also makes it possible to incorporate flushing air ducts 14 into the retaining ring 13, so that the barrier 9 can be cleaned from particles and cooled by the flushing air.

LIST OF REFERENCE NUMERALS

1 Fastening assembly
3 Radar level-measuring device
5 Antenna
6 Cover
7 Microwave window
9 Barrier
11 Surface
13 Retaining ring
14 Flushing air duct
15 Flange
17 Housing
18 Lid
19 Adjusting device
20 Flushing air connection
21 Microwave-absorbing material
23 Male thread
91 Coating
131 Outer contour
132 Molded-on portion
151 Inner contour
I First space
II Second space
α Angle
H Main emission direction

We claim:

1. A fastening assembly for a radar level-measuring device with an antenna with a main emission direction, comprising a microwave window for the spatial and thermal separation and microwave connection of a first space and a second space with a plate- shaped, disk-shaped barrier at least partially permeable to microwaves, wherein a surface of the barrier oriented towards the antenna includes an angle unequal to 90° with the main emission direction, wherein the barrier is disposed in a retaining ring located in a flange.

2. The fastening assembly according to claim 1, wherein the angle (α) is greater than 60°.

3. The fastening assembly according to claim 1, wherein the retaining ring has at least one flushing air duct.

4. The fastening assembly according to claim 1, wherein the retaining ring comprises an outer contour of a spherical segment, and the flange comprises an inner contour corresponding to the outer contour.

5. The fastening assembly according to claim 1, wherein the antenna and the barrier are disposed in a housing that secures the antenna and the barrier so that the antenna and barrier are spaced apart.

6. The fastening assembly according to claim 5, wherein a position of the retaining ring can be changed and fixed by means of at least one adjusting device accessible from outside the housing.

7. The fastening assembly according to claim 5, comprising two adjusting devices configured as two knurled screws disposed in the housing.

8. The fastening assembly according to claim 5, wherein the adjusting device is configured as at least one pivot lever.

9. The fastening assembly according to claim 5, wherein the housing, on its inner face, is partially or completely lined with or made from a microwave-absorbing material.

10. The fastening assembly according to claim 5, wherein the housing is configured for accommodating a plurality of differently-configured radar level-measuring devices.

11. The fastening assembly according to claim 1, wherein the retaining ring has a two-part configuration as a first wedge ring and a second wedge ring that are rotated relative to one another in the circumferential direction, of which the first wedge ring is fixed at least in the axial direction and the second wedge ring secures the barrier.

12. The fastening assembly according to claim 1, wherein the barrier comprises an anti-adherent coating at least on a surface facing away from the antenna.

* * * * *